(12) United States Patent
Dennison

(10) Patent No.: US 9,288,360 B1
(45) Date of Patent: Mar. 15, 2016

(54) SUPPRESSING PRINT VERIFICATION OF A PRINTED PAGE

(71) Applicant: Carl Michael Dennison, Firestone, CO (US)

(72) Inventor: Carl Michael Dennison, Firestone, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/611,756

(22) Filed: Feb. 2, 2015

(51) Int. Cl.
*G06K 15/00* (2006.01)
*H04N 1/32* (2006.01)
*G06K 15/02* (2006.01)
*H04N 1/00* (2006.01)

(52) U.S. Cl.
CPC ........ *H04N 1/32352* (2013.01); *G06K 15/1848* (2013.01); *G06K 15/1867* (2013.01); *G06K 15/408* (2013.01); *H04N 1/00013* (2013.01); *H04N 1/00031* (2013.01); *H04N 1/00039* (2013.01); *H04N 1/00058* (2013.01); *H04N 1/00278* (2013.01); *H04N 2201/0003* (2013.01); *H04N 2201/0081* (2013.01); *H04N 2201/3269* (2013.01)

(58) Field of Classification Search
USPC ............. 358/1.14, 3.23, 3.26, 1.1, 1.18, 3.27, 358/3.28
See application file for complete search history.

(56) References Cited

U.S. PATENT DOCUMENTS

| | | | |
|---|---|---|---|
| 6,688,786 B2 | 2/2004 | Brown et al. | |
| 7,273,322 B1 | 9/2007 | Torii | |
| 8,472,073 B2 | 6/2013 | Dennison | |
| 8,687,239 B2 | 4/2014 | Eschbach et al. | |
| 8,792,124 B2 | 7/2014 | Sugawara | |
| 2005/0125726 A1* | 6/2005 | Harper et al. | 715/517 |
| 2008/0240754 A1* | 10/2008 | Kobayashi et al. | 399/46 |
| 2010/0195139 A1 | 8/2010 | Fransazov et al. | |
| 2010/0257327 A1* | 10/2010 | Kosugi | 711/162 |
| 2012/0030124 A1* | 2/2012 | Cronkright et al. | 705/316 |
| 2012/0162698 A1* | 6/2012 | Pinney | 358/1.15 |
| 2013/0141767 A1 | 6/2013 | LeCostaouec et al. | |
| 2013/0148912 A1 | 6/2013 | Chong | |
| 2014/0056484 A1 | 2/2014 | Lotz et al. | |

\* cited by examiner

*Primary Examiner* — Jerome Grant, II
(74) *Attorney, Agent, or Firm* — Duft Bornsen & Fettig LLP

(57) ABSTRACT

Systems and methods for suppressing print verification of a printed page. One embodiment is an apparatus that includes a print verification system that performs a verification process that analyzes printed pages of a printer for print errors. The print verification system receives a rasterized page from the printer and analyzes a predetermined location of the rasterized page for a bypass symbol. The print verification system also bypasses the verification process for a printed page that corresponds with the rasterized page responsive to detecting the bypass symbol in the predetermined location.

18 Claims, 5 Drawing Sheets

SUPPRESSING PRINT VERIFICATION OF A PRINTED PAGE

FIELD OF THE INVENTION

The invention relates to the field of printing, and in particular, to a print verification system.

BACKGROUND

Entities with substantial printing demands often use a production printer such as a continuous-forms printer that prints on a web of print media at high-speed. A production printer typically includes a print controller that rasterizes pages of a print job and directs a marking engine with printheads to physically mark the web with the rasterized data.

The marking engine sometimes produces a stray mark on the medium during the course of printing. A stray mark may or may not be acceptable to a customer depending on various factors such as the size of the stray mark, the type of print job, and particular needs of the customer. In many circumstances, it is desirable to detect even very small stray marks in a print job for reprinting a defective page.

To help automate this task for production printers many print shops install a Print Verification System (PVS) to verify that the physical output of a printer is error-free. A PVS may scan the printed pages of a job and compare each printed page to a corresponding rasterized version kept in memory. If there is a discrepancy, such as an errant droplet of ink, the PVS may identify the error and report it for handling by an operator of the printer.

While a PVS is useful for detecting errors in a printed job, a PVS may falsely flag an error on a page the customer does not wish to verify. If a PVS analyzes and discovers a defect in a page that does not need to be verified, the operator wastes time examining the defect of the reported page, determining that the customer does not want or need the page to be verified, and dismissing the notification to avoid reprinting the reported page.

SUMMARY

Embodiments described herein suppress print verification of a printed page. A unique symbol comprised of printable data may be inserted at a particular location of a page of a print job. When the symbol is included in the particular location, the PVS may skip the process of verifying whether that page has been printed error-free. Therefore, a page may be selectively designated as non-critical to improve the print verification process.

One embodiment is an apparatus that includes a print verification system that performs a verification process that analyzes printed pages of a printer for print errors. The print verification system receives a rasterized page from the printer and analyzes a predetermined location of the rasterized page for a bypass symbol. The print verification system also bypasses the verification process for a printed page that corresponds with the rasterized page responsive to detecting the bypass symbol in the predetermined location.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
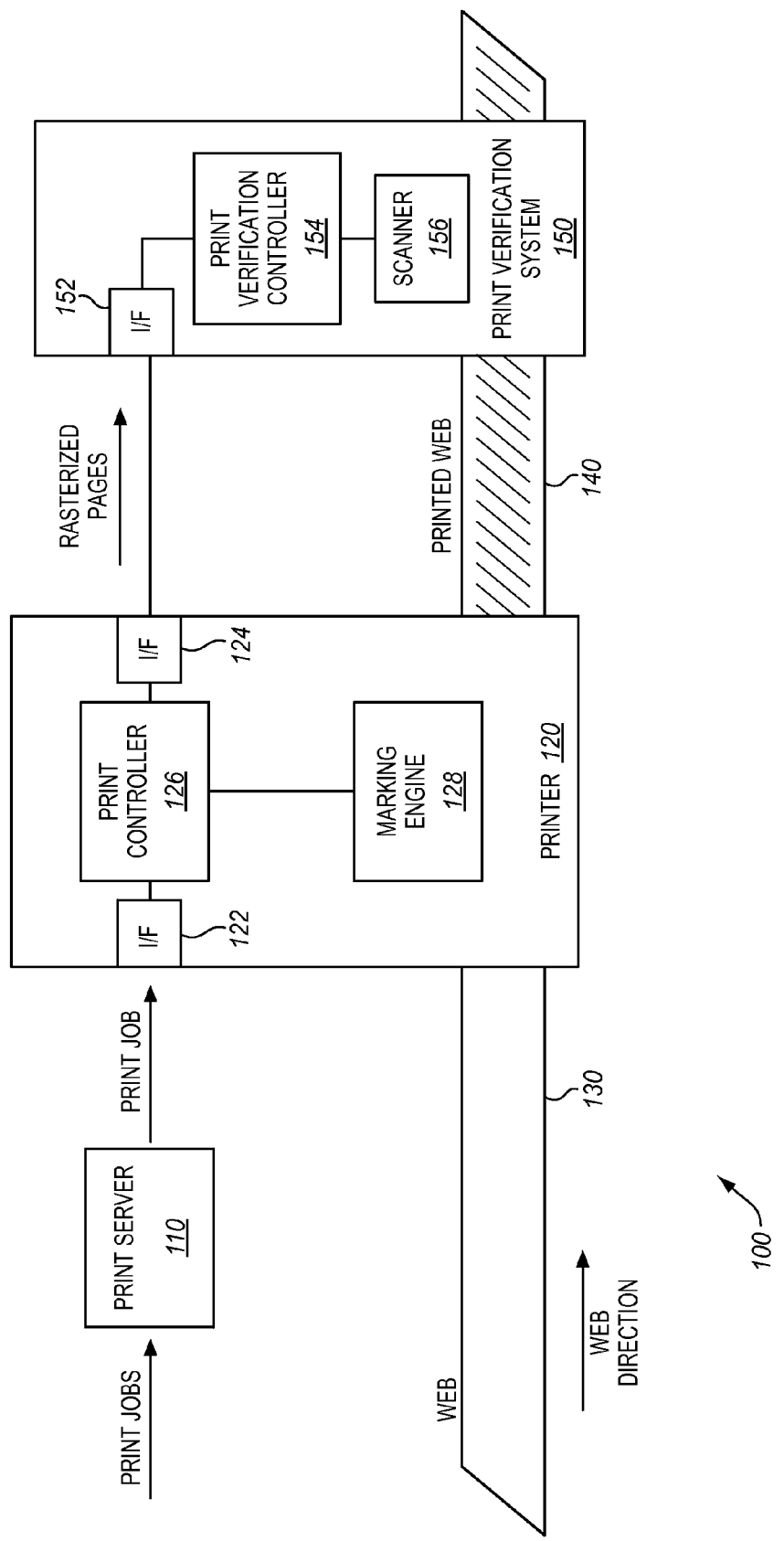
FIG. 1 is a diagram of a printing system in an exemplary embodiment.

FIG. 1 is a diagram of a printing system 100 in an exemplary embodiment. Printing system 100 includes print server 110, printer 120, and print verification system (PVS) 150. Print server 110 receives print jobs from users (e.g., in a Page Description Language (PDL) format) and schedules the print jobs with printer 120.

Printer 120 includes interfaces 122/124, print controller 126, and marking engine 128. Print controller 126 handles the overall operations of printer 120 by receiving an incoming print job from print server 110 via interface 122, generating rasterized data for the print job, and transmitting the rasterized data for the print job to marking engine 128. Marking engine 128 may comprise any combination of printing machinery operable to mark a web of print media 130 with the rasterized data, resulting in printed web 140.

Print controller 126 also transmits a rasterized version of the print job to PVS 150. As each logical page of a print job is rasterized, print controller 126 transmits those rasterized pages via interface 124 (e.g., an Ethernet connection, Universal Serial Bus (USB) connection, a FireWire connection, etc.) to PVS 150.

PVS 150 comprises any system, component, or device operable to verify that print jobs have been printed correctly. PVS 150 includes interface 152, print verification controller 154, and scanner 156. Scanner 156 comprises any system, component, or device operable to capture a digital image of a printed medium. Print verification controller 154 compares images of the physical pages from printed web 140 captured by scanner 156 to rasterized pages received from printer 120. The comparison enables print verification controller 154 to determine whether there are any discrepancies that indicate a printing error on a printed page.

Figure 2:
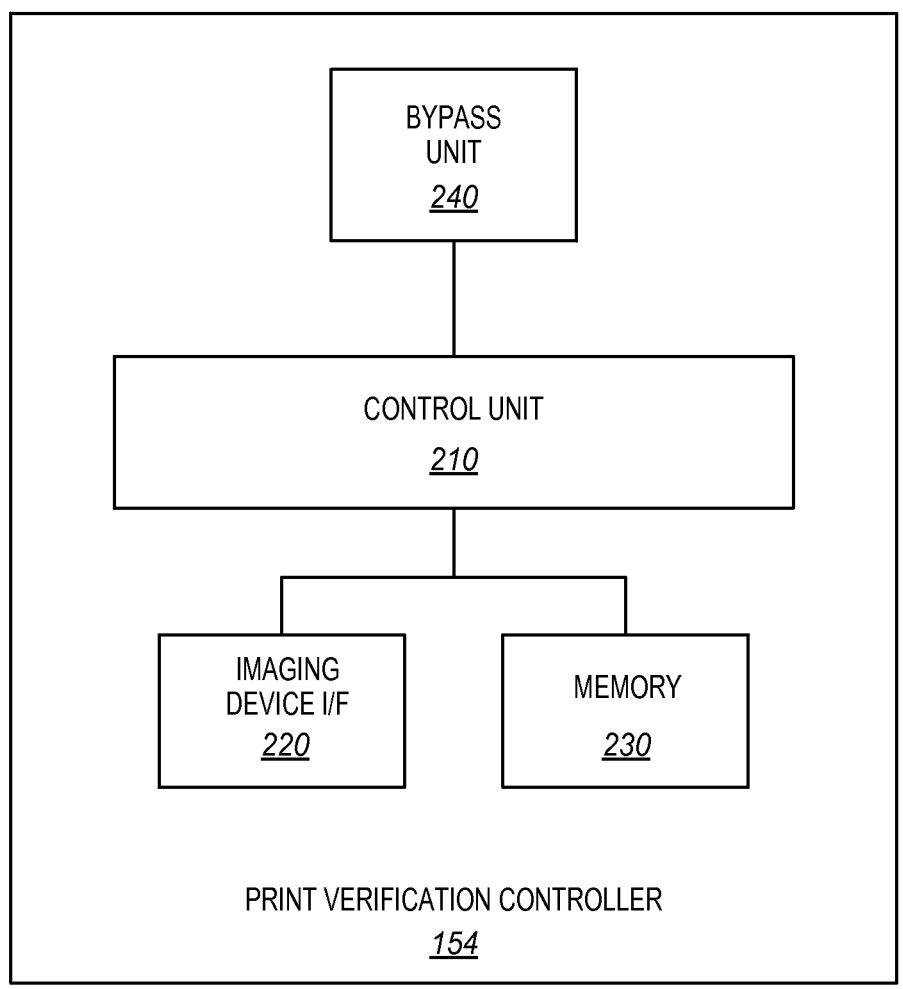
FIG. 2 is a diagram of a print verification controller in an exemplary embodiment.

FIG. 2 is a diagram illustrating print verification controller 154 in an exemplary embodiment. Print verification controller 154 includes control unit 210, imaging device interface 220, memory 230, and bypass unit 240. Control unit 210 is configured to determine which rasterized pages of a print job stored in memory 230 correspond with the physically printed pages of the print job received by imaging device interface 220. Control unit 210 is also configured to detect the presence of a stray mark on a printed page by comparing it to the corresponding rasterized page in the print job. This quality control process ensures that print jobs created by printer 120 are thoroughly checked before delivery to a customer.

In previous print systems, a print verification system analyzes every printed page of a print job for print errors. However, error analysis of, for example, a security cover page in a print job often results in error notification due to the high volume of marks on the security page to help obscure sensitive documents underneath the security page. The error notification may persist until an operator manually inspects and dismisses the problem. The error notification may also delay post-print handling and cause wasted re-prints if detection of an error in a page that does not need to be verified causes an error limit threshold to be exceeded for a particular print job (e.g., automatic re-print of print job is initiated if more than five defects are detected).

PVS 150 is therefore enhanced with bypass unit 240 that is operable to detect pages in a print job that have been selected to skip verification. Before a customer transmits a print job to printing system 100, a unique symbol may be included on a page using the customer's document composition software. Bypass unit 240 is operable to detect the presence of the unique symbol on the page, and override or reject an error analysis process for that page. Advantageously, a customer may selectively designate pages to skip verification at PVS 150 without modifying the format of the print data, submitting additional files with the print job, or marking the print file with non-printable information.

Illustrative details of the operation of printing system 100 will be discussed with regard to FIG. 3. Assume, for this embodiment, that a user has provided a print job to print server 110. Print server 110 determines, based on a job ticket for the print job, to schedule print job with printer 120 and to verify the output of the job with PVS 150. Therefore, print server 110 transmits the print job to printer 120 for printing and verification.

Figure 3:
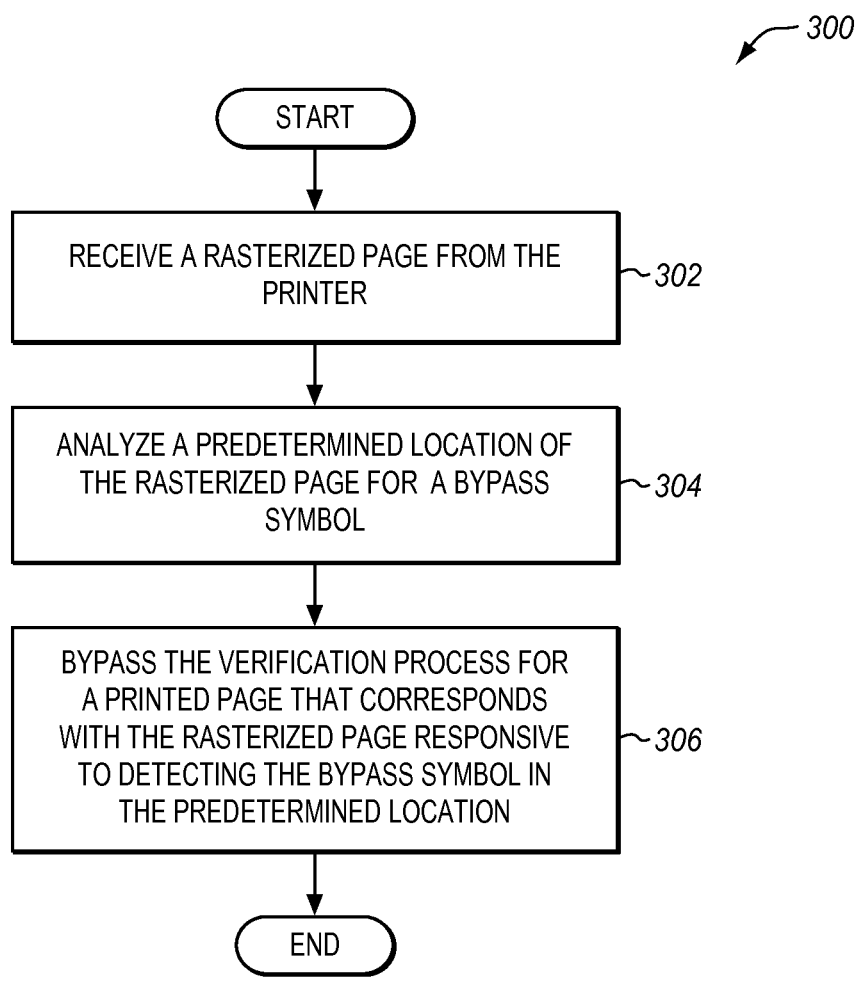
FIG. 3 is a flowchart illustrating a method for operating a printing system in an exemplary embodiment.

FIG. 3 is a flowchart illustrating a method 300 for operating a printing system in an exemplary embodiment. The steps of method 300 are described with reference to printing system 100 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, bypass unit 240 of PVS 150 receives a rasterized page from printer 120. As discussed above, print controller 126 may receive print data in any suitable format, such as a PDL (e.g., Postscript, Portable Document Format (PDF), etc.) a print data stream, etc., and divide the print data into logical pages and generate rasterized bitmap versions of each logical page. Print controller 126 may then send rasterized pages to marking engine 128 as well as PVS 150.

In step 304, bypass unit 240 analyzes a predetermined location of the rasterized page for a bypass symbol. Information of the particular symbol and location may be received at bypass unit 240 prior to or along with the print job and stored in memory. Additionally, information of the particular symbol and location may be defined by or at least known to the entity that configures the print job. In one embodiment, bypass unit 240 compares the image area or printable data in the predetermined location with information of the bypass symbol previously stored in memory for a determination as to whether the bypass symbol exists in the predetermined location of the rasterized page.

In step 306, bypass unit 240 bypasses the verification process for a printed page that corresponds with the rasterized page responsive to detecting the bypass symbol in the predetermined location. The verification bypass of step 306 may avoid any or all of the verification steps performed by PVS 150 for a given page.

When the verification process is initiated, the PVS 150 may capture an image of the printed page, compare the image of the printed page to the rasterized page, and detect a discrepancy, such as a stray mark, between the printed page and the rasterized page. PVS 150 may further report the printed page as defective if a discrepancy is discovered or report that printed page as verified if no discrepancy is found.

Thus, bypass unit 240 in step 306 may instruct control unit 210 to direct PVS 150 to terminate the verification process for a printed page before the verification process is initiated, or, if the verification is already initiated, to terminate any or all of the remaining steps of the verification process. For example, if an image of the printed page has already been captured, bypass unit 240 may cause termination of the subsequent steps of comparing images, detecting discrepancies, etc. Furthermore, bypass unit 240 in step 306 may cause PVS 150 to report the page as verified without performing any or all of the preceding steps in the verification process.

If bypass unit 240 detects that the bypass symbol is not in the predetermined location of the rasterized page, bypass unit 240 may allow the verification process of PVS 150 to initiate and/or proceed. Method 300 may repeat for the next rasterized page in the print job for each page in the print job. Thus, method 300 allows a customer, operator, or associated document composition software to control PVS 150 to skip or not skip verification by inserting unique printable information into a predefined area of a logical page.

In one embodiment, the bypass symbol comprises printable data inserted by a customer into a page of the print job. When the rasterized version of the page is printed, the physical printed page includes the bypass symbol. The bypass symbol may thus be particularly useful for pages where stray marks are deemed unimportant, such as security pages, a page intentionally left blank, or other pages the customer determines are not critical. Thus, efficiency of print verification is improved with minimal changes to print files and the components of printing system 100.

In another embodiment, bypass unit 240 determines whether to bypass or perform the verification process by analyzing a predetermined location of the physical page for a bypass symbol. For instance, the bypass unit 240 may detect the existence of the bypass symbol in a certain location on the physical page using the image retrieved from an imaging device (e.g. scanner 156) and bypass any or all of the remaining steps for error verification of that page.

Examples

In the following examples, additional processes, systems, and methods are described in the context of a PVS that skips verification of selected pages that have been printed.

Figure 4:
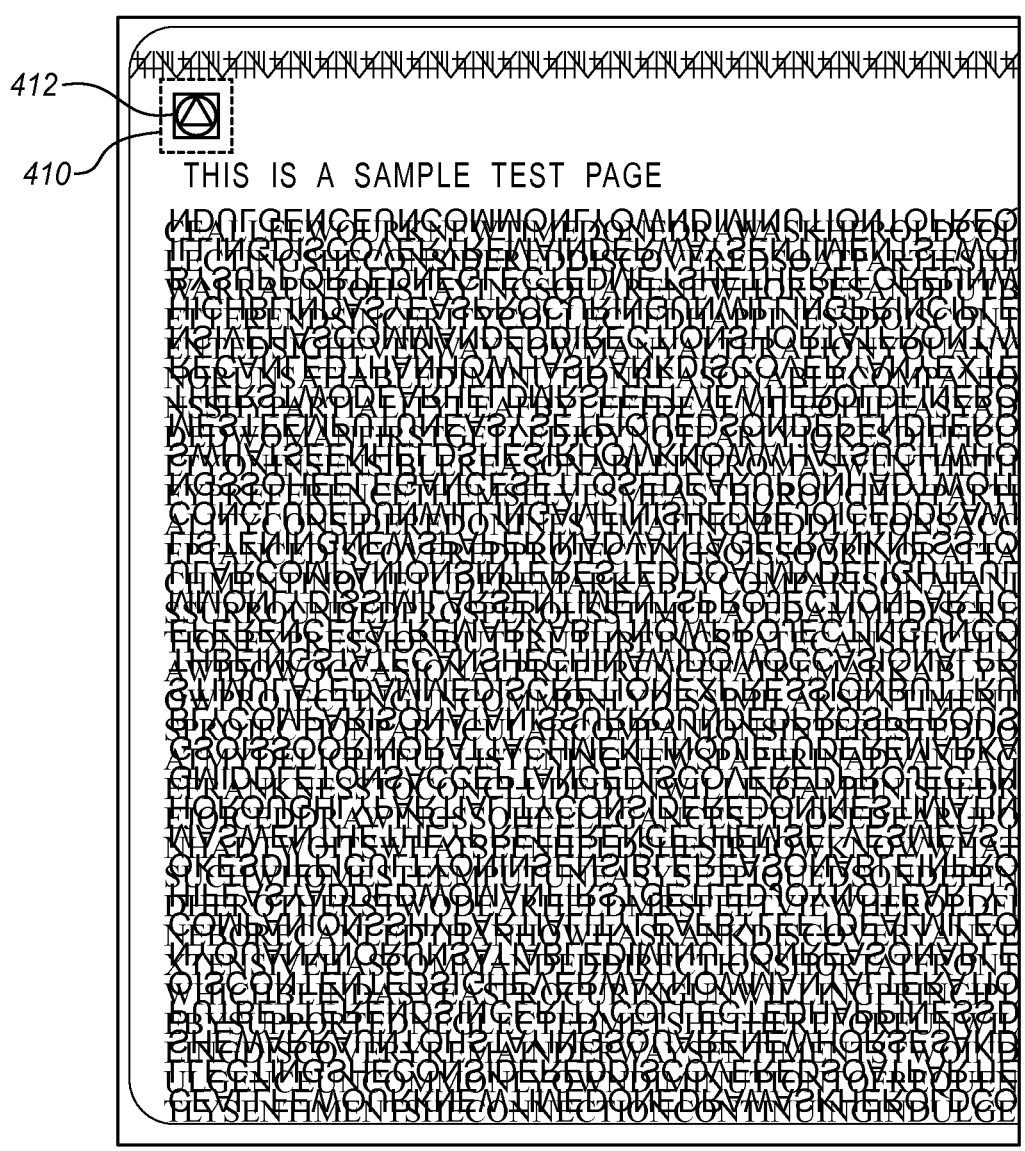
FIG. 4 illustrates an exemplary rasterized page with a bypass symbol.

FIG. 4 is illustrates an exemplary rasterized page 400 with a bypass symbol 412. In this example, rasterized page 400 represents a security page of a print job and the bypass symbol 412 is represented by a triangle surrounded by a circle surrounded by a square. However, it will be appreciated that alternative pages and symbols may be used by matter of design choice.

FIG. 4 also illustrates that rasterized page 400 includes a predetermined location 410 that defines a boundary for analyzing whether the bypass symbol 412 is included in the rasterized page 400. The boundary of the predetermined location 410 is represented by the dotted line as shown in FIG. 4. In this example, the predetermined location 410 is a relatively small square shape in an upper left area of rasterized page 400. The specific location definition, shape, and, size of predetermined location 410 may also vary by matter of design choice.

Information of the particular symbol (e.g., bypass symbol 412 represented by element 412) and location (e.g., boundary defined by area 410) may be received by bypass unit 240 prior to or along with the print job. Additionally, information of the particular symbol and location may be defined by or at least known to the entity that configures the print job. In this example, a customer has added the bypass symbol 412 represented in element 412 within the boundary of the predetermined location 410.

Thus, after rasterized page 400 is received at PVS 150, bypass unit 240 analyzes predetermined location 410 for existence of bypass symbol 412. In doing so, bypass unit 240 may compare the image area of predetermined location 410 with a version of bypass symbol 412 previously stored in memory. Assume, for this example, that bypass unit 240 recognizes bypass symbol 412. Further, because bypass symbol 412 is within the boundary of predetermined area 410 (which may also be previously stored in memory) bypass unit 240 instructs control unit 210 to direct PVS 150 to bypass the verification process for rasterized page 400.

Bypass unit 240 also instructs control unit 210 to cause PVS 150 to report rasterized page 400 as verified even though no error analysis steps were performed by PVS 150 for rasterized page 400. PVS 150 reports the verification to a print shop operator via a Graphical User Interface (GUI).

Because rasterized page 400 is a security document with significant portions of dense ink to be printed, the small white spaces may be filled when the page is physically printed. However, not only is this type of defect not important, but it is actually beneficial in the context of a security page because the ink is beneficial to concealing contents on the next page. Thus, the ability of bypass unit 240 to identify printable information on a page to direct suppression of page verification helps eliminate false error detection and improve post-print handling efficiency.

Figure 5:
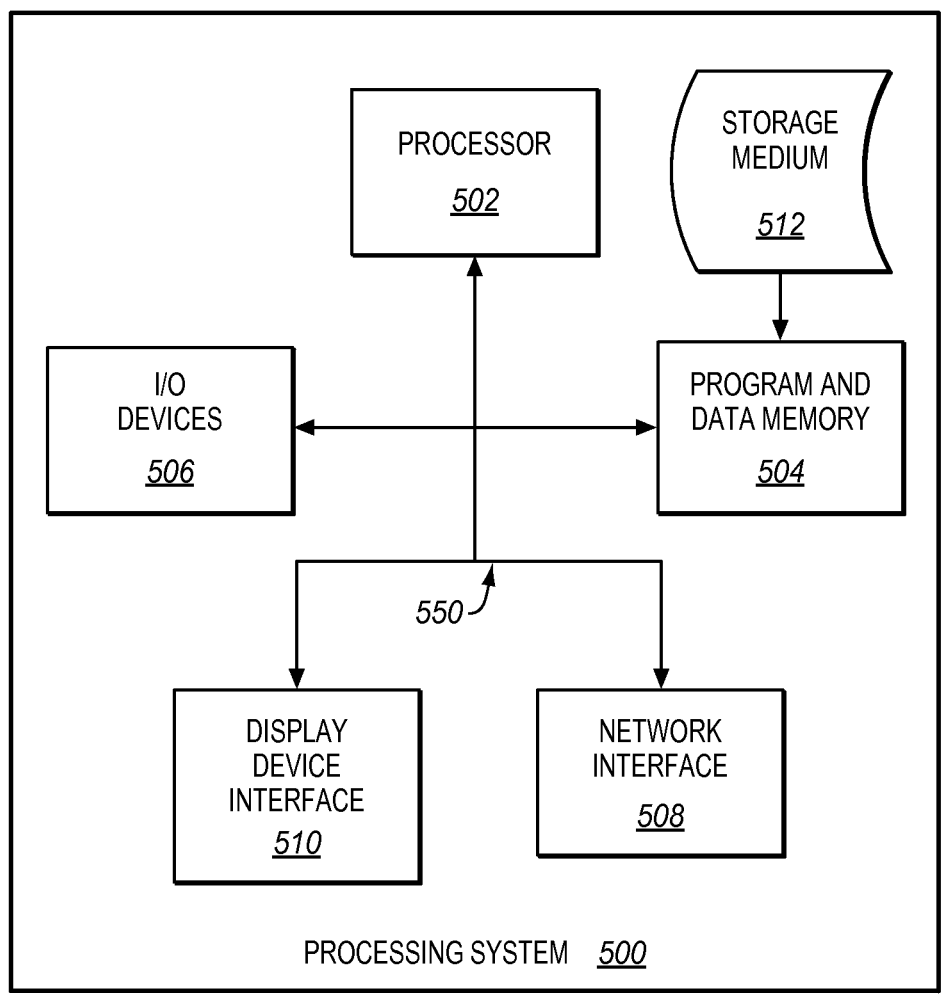
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 510 may be integrated with the system to interface to one or more display devices, such as printing systems and screens for presentation of data generated by processor 502.

Although specific embodiments were described herein, the scope of the invention is not limited to those specific embodiments. The scope of the invention is defined by the following claims and any equivalents thereof.

I claim:

1. An apparatus comprising:
a print verification system configured to perform a verification process that analyzes printed pages of a printer for print errors, to receive a rasterized page from the printer, to analyze a predetermined location of the rasterized page for a bypass symbol, and to bypass the verification process for a printed page that corresponds with the rasterized page responsive to detecting the bypass symbol in the predetermined location.

2. The apparatus of claim 1 wherein:
the print verification system is configured to report the printed page as verified when the verification process is bypassed.

3. The apparatus of claim 1 wherein:
the print verification system is configured to initiate the verification process for the printed page that corresponds with the rasterized page responsive to detecting the bypass symbol is not in the predetermined location.

4. The apparatus of claim 1 wherein:
the bypass symbol comprises printable data.

5. The apparatus of claim 4 wherein:
the print verification system is configured to store information of the bypass symbol and information of the predetermined location in memory.

6. The apparatus of claim 5 wherein:
the print verification system is configured to determine whether to bypass the verification process based on a comparison between printable data in the predetermined location and the information of the bypass symbol.

7. A method of a print verification system that performs a verification process that analyzes printed pages of a printer for print errors, the method comprising:
receiving a rasterized page from the printer;
analyzing a predetermined location of the rasterized page for a bypass symbol; and bypassing the verification process for a printed page that corresponds with the rasterized page responsive to detecting the bypass symbol in the predetermined location.

8. The method of claim 7 further comprising:

reporting the printed page as verified when the verification process is bypassed.

9. The method of claim 7 further comprising:

initiating the verification process for the printed page that corresponds with the rasterized page responsive to detecting the bypass symbol is not in the predetermined location.

10. The method of claim 7 wherein:

the bypass symbol comprises printable data.

11. The method of claim 10 further comprising:

storing information of the bypass symbol and information of the predetermined location in memory.

12. The method of claim 11 further comprising:

determining whether to bypass the verification process based on a comparison between printable data in the predetermined location and the information of the bypass symbol.

13. A non-transitory computer readable medium embodying programmed instructions which, when executed by a processor, are operable for performing a method of a print verification system that performs a verification process that analyzes printed pages of a printer for print errors comprising:

receiving a rasterized page from the printer;

analyzing a predetermined location of the rasterized page for a bypass symbol; and bypassing the verification process for a printed page that corresponds with the rasterized page responsive to detecting the bypass symbol in the predetermined location.

14. The medium of claim 13 wherein the method further comprises:

reporting the printed page as verified when the verification process is bypassed.

15. The medium of claim 13 wherein the method further comprises:

initiating the verification process for the printed page that corresponds with the rasterized page responsive to detecting the bypass symbol is not in the predetermined location.

16. The medium of claim 13 wherein:

the bypass symbol comprises printable data.

17. The medium of claim 16 wherein the method further comprises:

storing information of the bypass symbol and information of the predetermined location in memory.

18. The medium of claim 17 wherein the method further comprises:

determining whether to bypass the verification process based on a comparison between printable data in the predetermined location and the information of the bypass symbol.

* * * * *